July 4, 1950  F. J. VANDEMARK  2,513,604
TRAILER
Filed Sept. 12, 1946
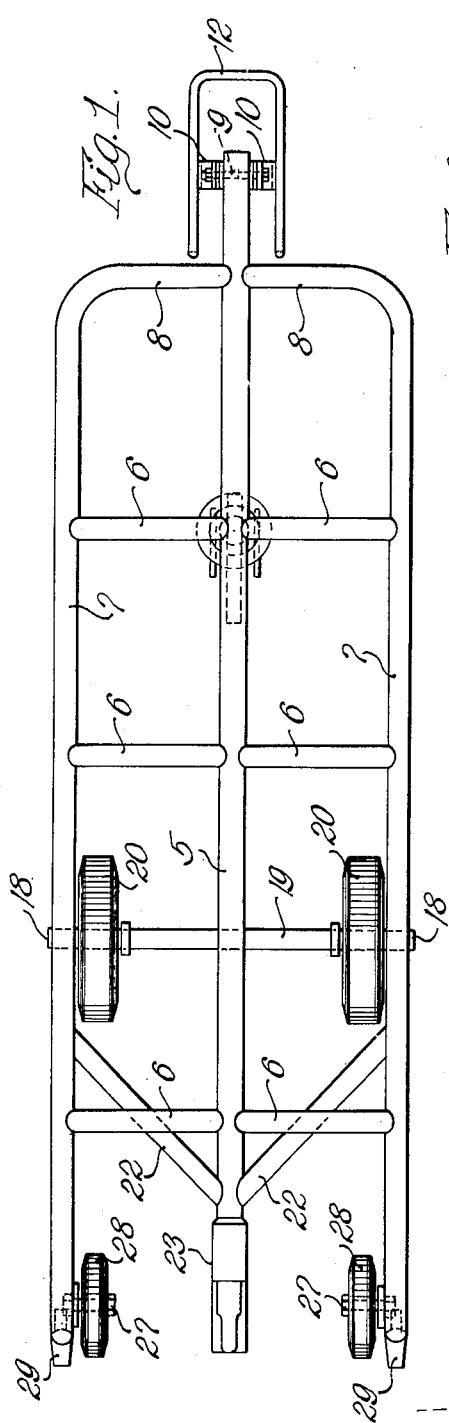
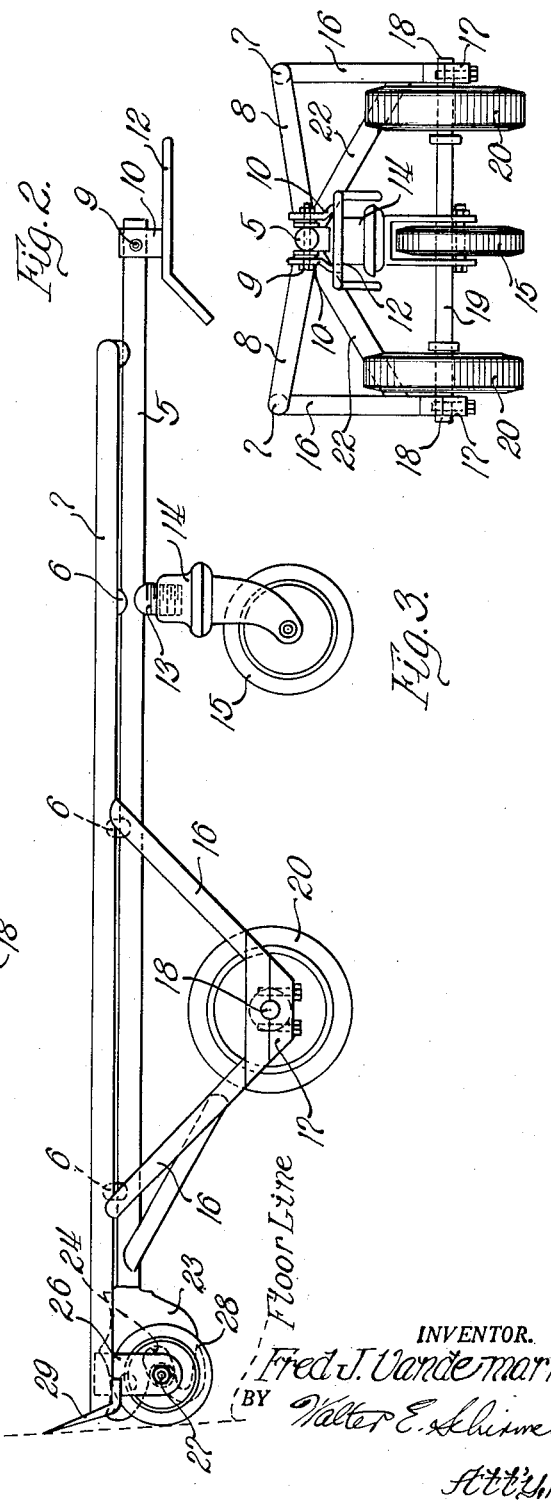
INVENTOR.
Fred J. Vandemark
BY Walter E. Schirmer
Atty.

Patented July 4, 1950

2,513,604

UNITED STATES PATENT OFFICE 2,513,604

TRAILER

Fred J. Vandemark, Memphis, Tenn.

Application September 12, 1946, Serial No. 696,393

4 Claims. (Cl. 280—33.4)

This invention relates to trailers and, more particularly, is concerned with a provision of a trailer for handling bales of cotton, linters, or the like, which trailer is of a unique design, capable of adequately supporting its load, the trailer being one of a series of such trailers to be used in connection with a power tractor for moving the bales or the like through a plant or warehouse.

One of the primary objects of the present invention is to provide a trailer of this type which is tiltable to facilitate the loading of cotton, linters, or other bulky articles onto the trailer, and then returnable into position for regular operation so that it can be moved by the power tractor from place to place within the warehouse or processing plant. Another object of the present invention is to provide a frame construction in which the trailer frame has a central tubular member through which the towing stresses are transmitted, thereby eliminating any towing strains upon the balance of the trailer.

Another feature of the present invention is to provide a trailer construction in which the trailer body is designed so that it balances fairly well on two wheels, allowing an operator to maneuver it around in position in much the same manner as a hand truck.

Still another feature of the present invention is to provide a light weight rigid trailer construction, preferably made of seamless tubular construction which is welded in place and provided with a coupling mechanism of a balanced design, such that each trailer is supported independently of the weight of any associated trailers in the trailer train. The purpose of this latter feature is to provide uniform trailers of the same weight, which, when connected in a trailer train, can be individually and progressively moved over a platform scale so that the articles carried thereon can be weighed, and the trailer weight being known, the net weight of the article, such as a cotton bale or the like, can be readily ascertained. Preferably, the trailer is provided at its rear end, with small wheels which allow for movement of the trailer when it is tilted upwardly to receive a bale of cotton or the like, and forwardly of the main supporting wheels, the trailer is supported by a caster wheel to allow it to be steered when in a trailer train.

Other objects and advantages of the present invention will appear more fully from the following detailed description, which, taken in connection with the accompanying drawing, will disclose to those skilled in the art, the particular construction and operation of a preferred form of the present invention.

In the drawing;

Figure 1 is a top plan view of a trailer construction embodying the present invention;

Figure 2 is a side elevational view of the trailer shown in Figure 1, and,

Figure 3 is a front end view of the trailer shown in Figure 1.

Referring now in detail to the drawing, the trailer body consists generally of a central tubular frame member 5, to which is welded normally extending arm portions 6, preferably also, formed of tubular members, and to the free ends of the arm portions are welded side frame tubular members 7, which, at their forward ends, are turned inwardly, as indicated at 8 and are welded to the central member 5. It will be noted that the arms 6 extend slightly upwardly from the main frame member 5, so that the side rails or tubular elements 7 are disposed slightly above the horizontal plane through the central member 5, thereby forming a concave bed or frame work, within which the bale of cotton, linters or other articles, is disposed.

The main frame member 5 projects forwardly of the inturned ends 8 of the member 7 and is provided at its forward end with a transverse pin 9 which is adapted to receive the bracket portions 10 of a coupler mechanism indicated generally at 12. It will thus be apparent that the coupler mechanism 12 is pivotally supported from the member 5 by means of the pin 9, and the coupler 12 preferably is so balanced that it will be maintained in a substantially horizontal position at all times, thereby facilitating coupling of the forward end of the trailer to either a tractor or to the rear end of preceding trailers. By reason of the pivot construction, it will be apparent that no portion of the weight of either a preceding or succeeding trailer will be imposed upon the trailer, thereby insuring that when it is weighed, the net weight of the articles carried by the trailer can be readily ascertained.

Welded to the under surface of the tubular member 5, adjacent the first pair of cross arms 6, is a spindle member 13, upon which is mounted the caster arm 14 which supports the wheel 15. The arm 14 is pivotally mounted relative to the spindle 13, in any desired manner so as to allow the wheel 15 to rotate when the trailer is moved about a corner or the like.

Adjacent the second and third pair of arms 6, the side rail members 7 have welded thereto, downwardly converging arm portions 16, preferably also formed of tubular elements to which are secured journal brackets 17 which receive the ends 18 of an axle member 19, upon which are mounted the main trailer supporting wheels 20. Suitable antifriction bearings may be employed in the bracket member 17 for receiving the axle ends 18, thereby supporting the trailer body for rotative movement about the axle 19 when it is desired to tilt the trailer in order to pick up a cotton bale or the like.

Suitably secured to the rear end of the member 5 are additional cross bracing tubular members 22 which extend downwardly and outwardly from the member 5 to the rear axle supporting member 16 as clearly shown in Figures 1 and 2. These form additional bracing for the axle supports to prevent them from lateral movement.

Beyond the point at which the braces 22 are secured to the central member 5, there is provided a coupling member 23 which includes a suitable recess or slot 24, adapted to receive the cross member of the coupler 12 of the succeeding trailer to lock it for towing purposes to the preceding trailer. This coupler member 23 may be of standard construction as is well known in the art.

Each of the side members 7 at their rear ends are provided with welded depending brackets 26 which are adapted to have pivots 27 carried thereby for rotatable supporting auxiliary wheels 28 thereon. The wheels 28 are employed when the trailer is tilted upwardly about the axle 19 and engage the floor to provide a balanced construction so that the fingers 29, carried at the extreme ends of member 7, can be moved to the edge of a cotton bale or the like, to tip it onto the trailer bed. The trailer is then restored to the horizontal position where it rests upon the wheels 20 and 15. In place of the wheels at the rear end of the trailer, there could be a rocker or lever attachment to obtain the same results, this end of the trailer being a construction somewhat similar to that of a hand truck.

It will therefore be apparent with the present construction, there is provided a trailer, which can be manufactured in quantity, of uniform weight and with universal type couplers so that the weight of the trailer is independent of any forces imparted thereto by the adjacent trailer to which it is connected, and in which the entire trailer structure is formed of tubular elements which may be welded in position. Also it will be noted that the relative positions of the wheels 20 with respect to the longitude extent of the trailer, provide for a balancing of the trailer frame in such manner that it can be easily lifted up or rotated about the axis of the main supporting wheels in order to lower the rear end to the floor line to facilitate picking up of the bulky articles which it is desired to transport by use of the trailer.

I am aware that various changes may be made in certain features of the present construction without in any way departing from the underlying features of the present invention, and I therefore do not intend to be limited except as defined by the scope and spirit of the appended claims.

I claim:

1. A trailer construction comprising side frame members and a lengthwise extending central frame member intermediate said side frame members, main load supporting wheel means beneath said frame disposed rearwardly of the transverse center thereof, load engaging means at the rear extremities of said side frame members, coupler means at the rearward end of said central frame member lying inwardly of the outer ends of said load engaging means, and rocker wheel means located intermediate said main load supporting wheels and said load engaging means, whereby said frame is adapted to be tilted rearwardly about said main supporting wheel means for engaging said rocker wheel means with the ground and said load supporting means with a load to be carried by said frame, and with said coupler means out of engagement with the ground.

2. A trailer construction comprising a pair of spaced parallel side frame members, a central member disposed intermediate of and parallel to said side frame members lying in a plane below the latter, transverse arms interconnecting said central and side frame members to form a grid for receiving baled goods, laterally spaced main supporting wheel means beneath said frame slightly aft of the transverse center thereof, caster wheel means supporting the fore part of said frame, load engaging means at the rear extremities of said side frame members, coupler means at the rearward end of said central frame member lying inwardly of the outer ends of said load engaging means and below said side frame members, and rocker wheel means located intermediate said main load supporting wheel means and said load engaging means, whereby said frame is adapted to be tilted rearwardly about said main supporting wheel means for engaging said rocker wheel means with the ground and said load supporting means with a load to be carried by said frame and with said coupler means out of engagement with the ground.

3. The trailer construction of claim 1 characterized by the provision of second coupler means carried by said frame and projecting forwardly beyond the front of said frame.

4. The trailer construction of claim 2 characterized by the provision of second coupler means carried by said frame and projecting forwardly beyond the front of said frame.

FRED J. VANDEMARK.

REFERENCES CITED

The following references are of record in the file of this patent:

UNITED STATES PATENTS

| Number | Name | Date |
|---|---|---|
| 1,432,296 | Mosel | Oct. 17, 1922 |
| 1,769,981 | Allison | July 8, 1930 |
| 1,866,887 | Gleason et al. | July 12, 1932 |
| 2,179,410 | Johnson | Nov. 7, 1939 |
| 2,374,383 | Sampsell | Apr. 24, 1945 |
| 2,387,504 | Farr | Oct. 23, 1945 |